United States Patent [19]

Matsuura

[11] Patent Number: 4,912,775
[45] Date of Patent: Mar. 27, 1990

[54] RF CONVERTER CIRCUIT

[75] Inventor: Syuuji Matsuura, Nara, Japan

[73] Assignee: Sharp Kabushiki Kaisha, Osaka, Japan

[21] Appl. No.: 401,537

[22] Filed: Aug. 30, 1989

Related U.S. Application Data

[63] Continuation of Ser. No. 131,946, Dec. 11, 1987, abandoned.

[30] Foreign Application Priority Data

Dec. 16, 1986 [JP] Japan .................................. 61-300677

[51] Int. Cl.$^4$ .............................................. H04B 11/18
[52] U.S. Cl. ..................................... 455/131; 455/234; 455/189
[58] Field of Search ............... 455/234, 313, 315, 316, 455/131, 182, 189, 188, 190, 4, 6; 358/86

[56] References Cited

U.S. PATENT DOCUMENTS

| | | | |
|---|---|---|---|
| 3,562,650 | 2/1971 | Gossard et al. | 455/131 |
| 3,900,821 | 8/1975 | Knubbe et al. | 455/316 |
| 4,654,885 | 3/1987 | Meszko et al. | 455/315 |
| 4,742,393 | 5/1988 | Sugai et al. | 358/188 |

Primary Examiner—Reinhard J. Eisenzopf
Assistant Examiner—Curtis A. Kuntz
Attorney, Agent, or Firm—Flehr, Hohbach, Test, Albritton & Herbert

[57] ABSTRACT

An RF converter circuit of a simplified structure includes a tuner circuit, an intermediate frequency amplifier circuit and a frequency conversion circuit connected in this order. An automatic gain control circuit is provided for reforming an intermediate frequency signal from the intermediate frequency amplifier circuit and transmitting the reformed signal to the tuner circuit such that an intermediate frequency signal can be directly converted into a RF signal.

3 Claims, 4 Drawing Sheets

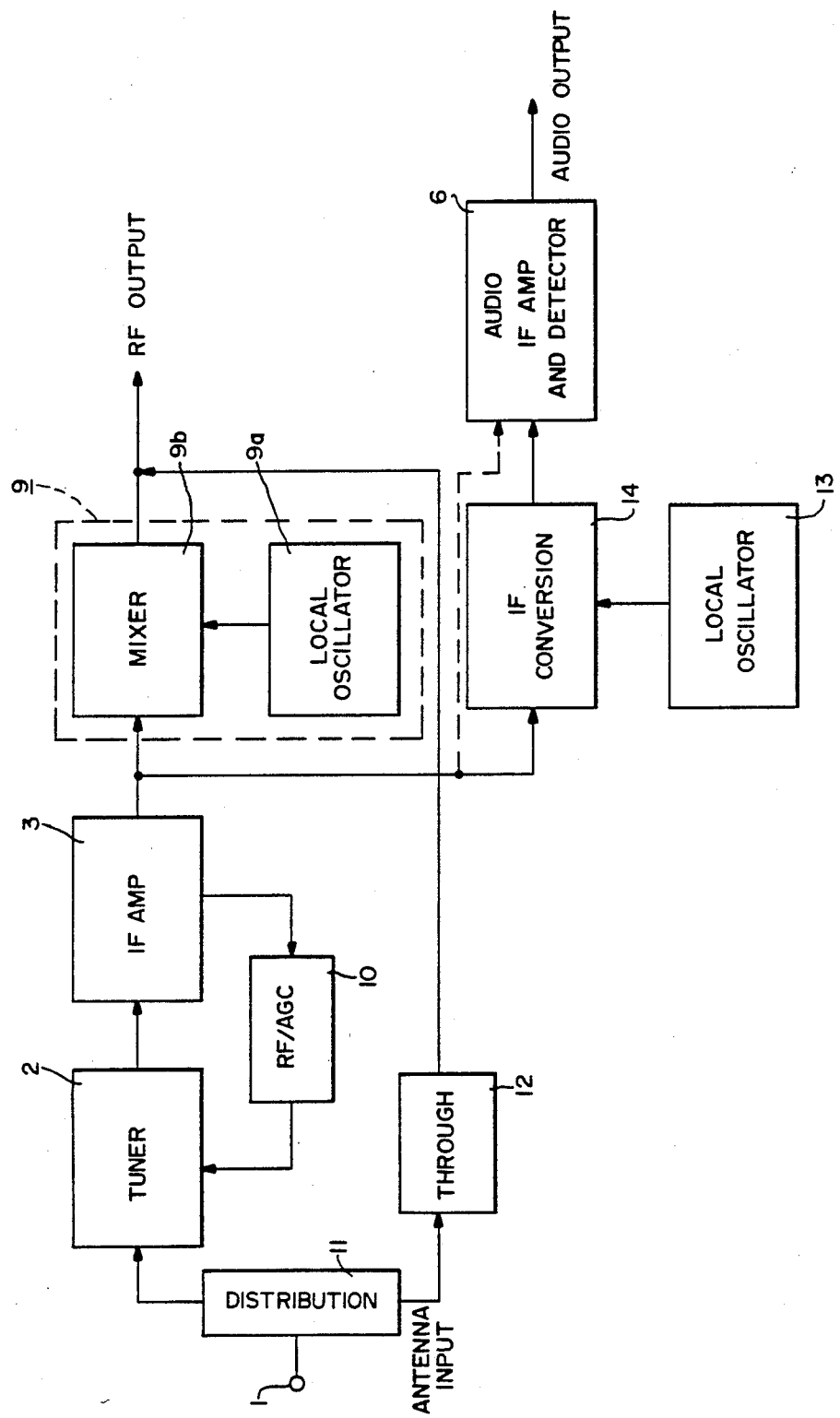
FIG.—1

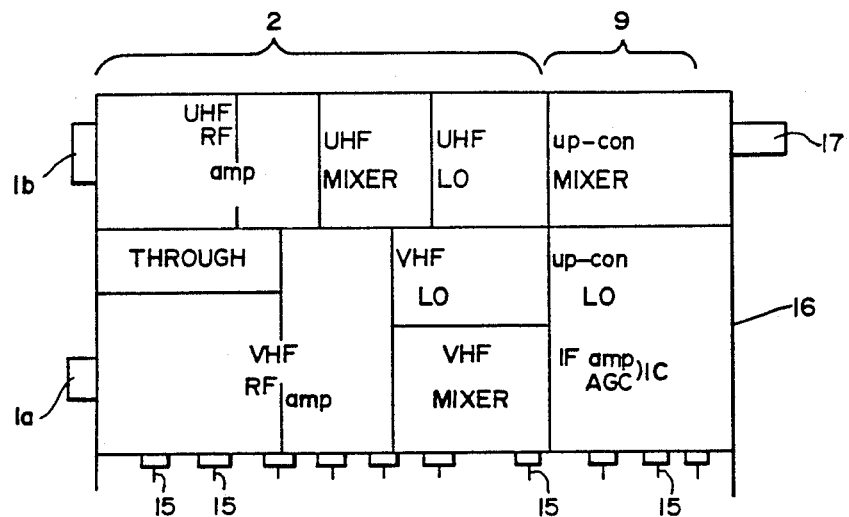
FIG.—2
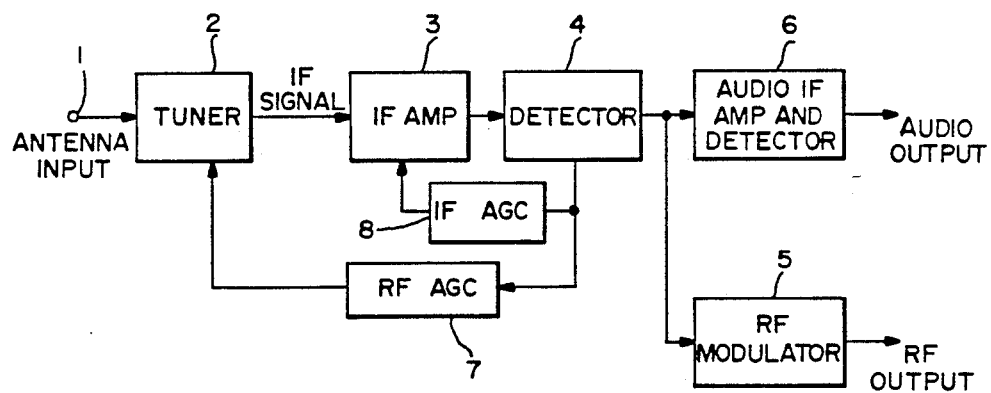
(PRIOR ART)
FIG.—4

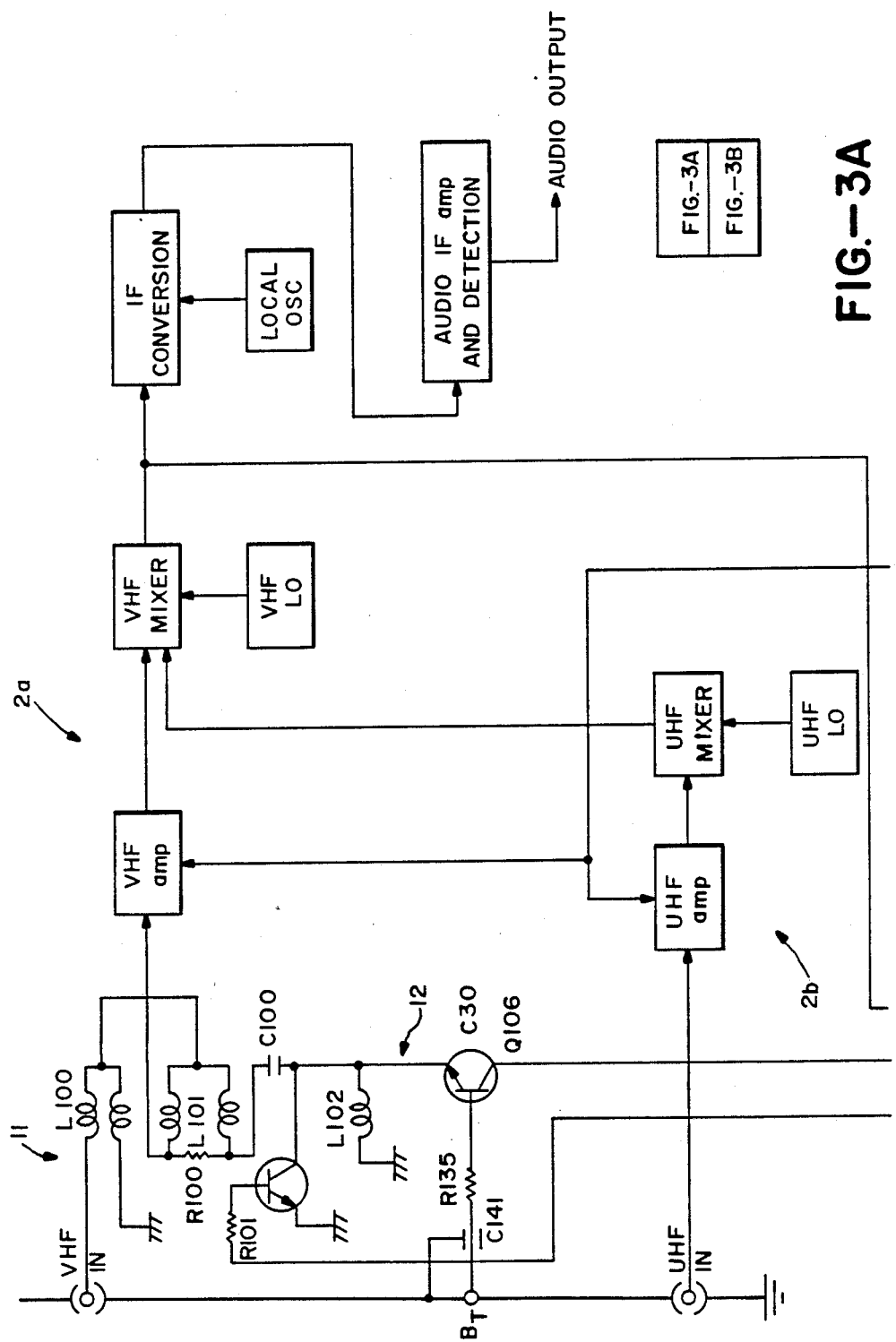

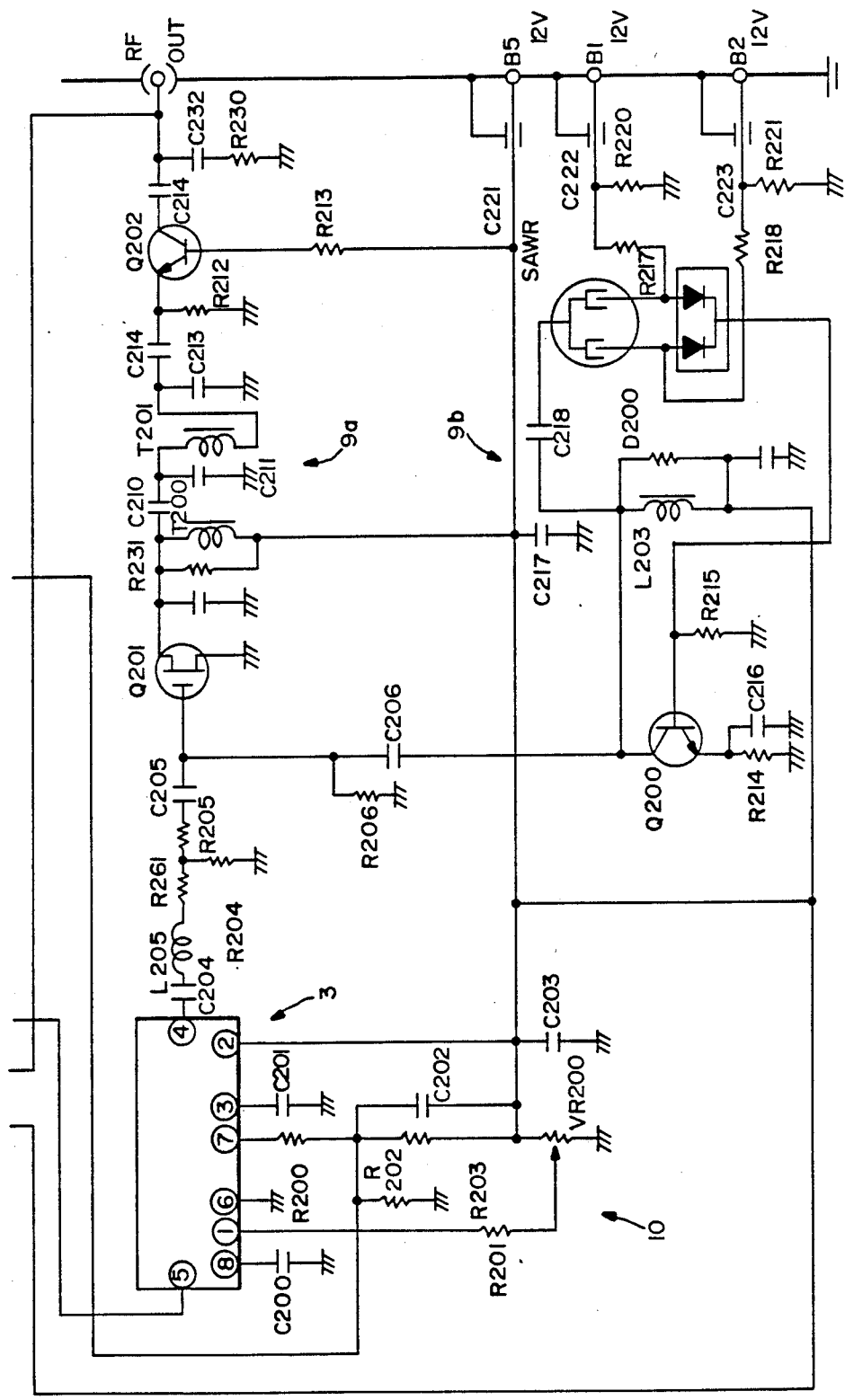
FIG.—3B

RF CONVERTER CIRCUIT

This is a continuation of application Ser. No. 131,946 filed Dec. 11, 1987, now abandoned.

BACKGROUND OF THE INVENTION

This invention relates to a radio frequency (RF) converter circuit used in an audio tuner with RF output, a CATV converter and the like.

As shown by the block diagram of a conventional RF converter circuit in FIG. 4, a high-frequency TV signal in the VHF or UHF band received by a reception antenna is inputted through an antenna input terminal 1 and only the desired signal is selected by a tuner circuit 2 and converted into an intermediate frequency (IF) signal. After this IF signal is amplified by an IF amplifier circuit 3, it is separated by a detector circuit 4 into a video signal and an audio signal and the video signal is modulated into a one-channel or two-channel carrier wave by a RF modulator circuit 5 and taken out as a RF signal while the audio signal is converted into an audio output by an audio circuit 6 comprised of audio IF amplifier and detector circuits. Numerals 7 and 8 respectively indicate a RF automatic gain control (AGC) circuit and an IF AGC circuit adapted to receive a signal from the detector circuit 4 and output it respectively by a delay-type AGC to the tuner 2 and to the IF amplifier circuit 3. The circuit described above is structurally complicated and is expensive although many of the component circuits are integrated. Moreover, tuning is difficult because there are two AGC circuits 7 and 8 to be adjusted.

SUMMARY OF THE INVENTION

It is therefore an object of the present invention to provide a RF converter circuit which is compact, inexpensive and structurally simplified and with which AGC can be adjusted easily.

The above and other objects of the present invention are achieved by providing an RF converter circuit comprising a tuner circuit, an IF amplifier circuit, a frequency modulator circuit and an AGC circuit for transmitting signals from the IF amplifier circuit to the tuner circuit.

With a circuit thus structured according to the present invention, the IF signal from the IF amplifier circuit is directly converted into a RF signal by the frequency modulator circuit. Thus, the RF converter circuit can be made compact, inexpensive, and structurally easy to adjust.

BRIEF DESCRIPTION OF THE DRAWINGS

The accompanying drawings, which are incorporated in and form a part of the specification, illustrate an embodiment of the present invention and, together with the description, serve to explain the principles of the ivention. In the drawings:

FIG. 1 is a block diagram of an RF converter circuit embodying the present invention, FIG. 2 is a drawing schematically showing a chassis structure and arrangement of circuits corresponding to FIG. 1, FIG. 3 is a more detailed diagram of an RF converter represented by FIG. 1, and FIG. 4 is a block diagram of a prior art RF converter circuit.

DETAILED DESCRIPTION OF THE INVENTION

An RF converter circuit embodying the present invention is described below with reference to FIG. 1 wherein components which function identically or equivalently to those shown in FIG. 4 such as the tuner circuit are designated by the same numerals. When a high frequency TV signal is received by a reception antenna (not shown) and through an antenna input terminal 1, it is divided into two signals by a distribution circuit 11, and one of the signals is directed to a tuner circuit 2 where a desired station is selected and amplified by an IF amplifier circuit 3 to become an IF signal (say, a video signal of 58.75 MHz and an audio signal of 54.25 MHz). This IF signal is frequency-converter by a frequency conversion circuit 9 and taken out as RF output. The frequency conversion circuit 9 is comprised of a local oscillator (LO) circuit 9a of 150 MHz or 156 MHz and a mixer circuit 9b and converts the IF video signal of 58.75 MHz into one-channel or two-channel video carrier frequency of 91.25 MHz or 97.25 MHz. For this reason, this circuit is also referred to as the up-converter (UP-CON) circuit below. Numeral 10 indicates a RF AGC circuit which reforms the IF signal from the IF amplifier circuit 3 by peak value-type detection and supplies it to the high-frequency amplifier circuit (UHF and VHF RF amplifiers) of the tuner circuit 2. The other of the signals from the distributor circuit 11 is directly taken out at the RF output terminal through a "through circuit" 12 which is switched on only when the tuner circuit 2 is not operating and switches off the signal from the antenna when the tuner circuit 2 is operating. The audio signal of 54.25 MHz is converted to 10.7 MHz by a split carrier method by a local oscillator circuit 13 of 64.95 MHz frequency conversion circuit 14 and taken out as audio output through an audio IF amplifier-detector circuit 6. Alternatively, as shown by a dotted line in FIG. 1, it may be taken out directly as audio output through the audio circuit 6.

With a circuit thus structured, there is no need for a detector circuit 4 shown in FIG. 4 because the video signal is not taken out. As a result, the IF AGC circuit 8 shown in FIG. 4 also becomes unnecessary and use is made only of the RF AGC circuit 10. Thus, the adjustment of AGC becomes much simplified with a circuit of the present invention. Moreover, adjustment may be dispensed with, depending on the level of fluctuations in the gain of the tuner circuit 2 or that of the IF amplifier circuit 3. The RF modulator 5 of FIG. 4 is also absent in the circuit of FIG. 1 and no adjustment is required with respect to the degree or level of modulation. Since an IF signal is directly converted into a RF signal, furthermore, there is no adverse effect on the quality of the image due to differential gain or differential phase.

The circuit described above by way of the block diagram of FIG. 1 can be arranged compactly as shown in FIG. 2. Numerals 15 indicate power terminals and numeral 16 indicates the chassis. Since a VHF input terminal 1a, a UHF input terminal 1b and a RF output terminal 17 can be disposed relatively close to one another, the loss by the through circuit 12 and the cost of connection can be both reduced.

For the purpose of illustration, an example of a converter circuit embodying the present invention is shown in parts more in detail in FIG. 3 where components which are equivalent and correspond to those shown in FIG. 1 are indicated by the same numerals and where letters R, C, L and Q indicate a resistor, a capacitor, an inductor (coil) and a transistor, respectively. The tuner circuit 2 of FIG. 1 is divided into a VHF tuner circuit 2a and a UHF tuner circuit 2b. In this converter circuit, the distribution circuit 11 is shown as comprising a balloon transformer with $L_{100}$ and $L_{101}$ and a load resistor $R_{100}$ for distributing an antenna input signal to the tuner 2a and to the through circuit 12. The through circuit 12 is shown as including switching transistors $Q_{100}$, $Q_{106}$ and $Q_{202}$. When the upconverter 9 is activated, or when power is applied to the up-converter 9, the switching transistor $Q_{100}$ of the through circuit 12 is switched off, and so are the transistors $Q_{106}$ and $Q_{202}$. This switches the entire through circuit 12 into the OFF condition, that is, the incoming signal cannot pass the through circuit 12. If the up-converter 9 is not active, on the other hand, the switching transistors $Q_{106}$ and $Q_{202}$ are short-circuited and the transistor $Q_{100}$ is switched off. This causes the through circuit 12 to be in the ON condition, that is, the incoming signal can pass therethrough. With reference to FIG. 3, $R_{101}$, $R_{135}$, $R_{213}$ and $R_{212}$ are bias resistors, $L_{102}$ is a peaking coil, $C_{100}$, $C_{232}$ and $C_{214}$ are DC-stopping capacitors, $C_{141}$, $C_{221}$, $C_{222}$ and $C_{223}$ bypass capacitors and $R_{230}$ is a terminator resistor. The IF amplifier circuit 3 comprises an IC, grounding capacitors $C_{200}$, $C_{201}$ and $C_{203}$, a low pass filter with $L_{205}$ and $C_{204}$, a DC-stopping capacitor $C_{205}$ and T-type attenuation circuit with $R_{261}$, $R_{205}$ and $R_{204}$. The AGC circuit 10 includes grounding capacitors $C_{203}$ and $C_{217}$, and AGC filter with $R_{202}$, $R_{203}$ and $C_{202}$ and bias resistors $R_{221}$, $R_{200}$ and $VR_{200}$.

The foregoing description of a preferred embodiment of the invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

What is claimed is:
1. An RF converter circuit comprising
a tuner circuit for selectively outputting a signal,
a through circuit,
a single antenna means adapted to receive a high frequency TV signal,
a distribution circuit connected to said single antenna means, said tuner circuit and said through circuit, said distribution circuit serving to distribute a signal received by said antenna means into two signals, to direct one of said two signals to said tuner circuit and to direct the other of said two signals directly to an RF output terminal through said through circuit if said through circuit is switched on, said through circuit being switched on only when said tuner circuit is not operating, said through circuit serving to prevent an incoming signal from said antenna means from passing therethrough when said tuner circuit is operating,
an intermediate frequency amplifier circuit connected to said tuner circuit to receive and amplify a signal outputted from said tuner circuit and to output an intermediate frequency signal including a video signal and an audio signal,
a first frequency conversion circuit connected to said intermediate frequency amplifier circuit for frequency-converting said video signal and outputting a frequency-converted video signal through said RF output terminal,
an automatic gain control circuit connected to said tuner circuit and said intermediate frequency amplifier circuit for receiving and reforming said intermediate frequency signal from said intermediate frequency amplifier circuit and transmitting a reformed signal to said tuner circuit, and
an audio intermediate frequency amplifier and detector, connected either directly or indirectly through a second frequency conversion circuit for frequency-converting said audio signal, for receiving said audio signal from said intermediate frequency amplifier circuit and outputting an audio signal.
2. The circuit of claim 1 wherein said first frequency conversion circuit includes a mixer connected to said intermediate frequency amplifier circuit and to said RF output terminal and a first local oscillator connected to said mixer.
3. The circuit of claim 1 wherein said second frequency conversion circuit includes an intermediate frequency conversion circuit connected to said intermediate frequency amplifier circuit and to said audio intermediate frequency amplifier and detector, and a second local oscillator connected to said intermediate frequency conversion circuit.

* * * * *